United States Patent [19]

Shew

[11] 4,247,023

[45] Jan. 27, 1981

[54] FOLLOWER ASSEMBLY FOR HAND GREASE GUNS

[75] Inventor: Jerry Shew, Niles, Ill.

[73] Assignee: Stewart-Warner Corporation, Chicago, Ill.

[21] Appl. No.: 72,989

[22] Filed: Sep. 6, 1979

[51] Int. Cl.³ .................................................. G01F 11/00
[52] U.S. Cl. ...................................... 222/386; 92/240
[58] Field of Search ....................... 92/240; 184/105 A; 222/256, 326, 327, 386, 391

[56] References Cited

U.S. PATENT DOCUMENTS

| | | | |
|---|---|---|---|
| 2,394,488 | 2/1946 | Rotter et al. | |
| 2,872,085 | 2/1959 | Mueller | |
| 2,886,215 | 5/1959 | Klein et al. | |
| 2,985,495 | 5/1961 | Neuman | |
| 3,059,819 | 10/1962 | Sundholm | |
| 3,092,427 | 6/1963 | Sadler et al. | 92/240 X |
| 3,215,320 | 11/1965 | Heisler et al. | 222/391 |
| 3,286,887 | 11/1966 | Sundholm | |
| 3,501,063 | 3/1970 | Sundholm | 222/326 |
| 3,655,101 | 4/1972 | Dorn | 222/326 |
| 3,780,830 | 12/1973 | Helgerud et al. | 184/105 A |

FOREIGN PATENT DOCUMENTS 606723 3/1958 Italy .......................................... 222/256

*Primary Examiner*—David A. Scherbel
*Attorney, Agent, or Firm*—Augustus G. Douvas

[57] ABSTRACT

A follower assembly for a lubrication gun that effectively seals in either the gun cylinder after bulk-loading of the lubricant, or a smaller diameter lubrication cartridge positioned alternatively in the gun cylinder. The primary element of the follower assembly is a one-piece elastomeric follower body slidably received on a follower rod in the gun cylinder. This elastomeric follower body has a heavy central portion with a thin forwardly extending outer wall that seals against different diameter bores. The forward end of this thin outer wall has a heavy inwardly directed flange portion that stabilizes the thin wall. A plurality of forwardly projecting posts on the heavy central portion of the follower body engage this flange to pull the thin wall when the follower assembly moves forwardly. The follower rod, during manual priming, moves the follower body forwardly by engagement between a projection on the rod and a back-up plate behind the follower body, and rearwardly by engagement of a washer carried by the rod with the front of the follower body.

15 Claims, 7 Drawing Figures

FOLLOWER ASSEMBLY FOR HAND GREASE GUNS

BACKGROUND OF THE INVENTION

The present invention relates to manually operated grease guns for lubricating bearing surfaces found in automobile chassis as well as various types of industrial equipment. These hand grease guns have a cylindrical reservoir or body that holds heavy grease, and a dispensing head mechanism for the grease at one end thereof. This dispensing mechanism is essentially a piston operated by two-bar linkage mehanism. A spring biased follower assembly in the cylindrical body of the gun continuously urges the heavy lubricant toward the dispensing head of the gun and into a chamber that slidably receives the dispensing piston. As the operator withdraws the piston from the chamber, the follower assembly forces lubricant into the chamber, and thereafter the operator manually drives the piston into the chamber forcing lubricant from a suitable outlet port under high presssure to the part to be lubricated.

The lubricant is loaded into the cylindrical body of the lubrication gun in a variety of ways, and the follower assembly must be adaptable to the different loading methods employed. Firstly, the gun may be loaded with lubricant using bulk loading techniques. Pressure loading is one of these where lubricant under pressure is loaded through the dispensing head from a source of lubricant under high pressure. Another bulk loading technique is referred to as suction loading and this is done by drawing lubricant through the dispensing head by manually withdrawing the follower assembly and evacuating the gun cylinder. Lastly, bulk loading can be effected simply by hand-packing the cylinder with heavy lubricant.

Besides bulk loading, the lubrication gun can be loaded with a lubrication cartridge that consists of a sleeve open at both ends and prepacked with lubricant. With the end of the lubrication gun removed, the cartridge is slid into the gun cylinder and the end replaced.

With this background, it has been found extremely difficult to devise a follower assembly that will adequately seal in both a cartridge and the inner diameter of the cylindrical body since they of course have different inner diameters. This problem has in the past been approached in a variety of ways, none of which have been found satisfactory.

One technique is to use a guide to aid in entry of the follower from the cylinder bore to the cartridge bore, and of course that not only requires an additonal part, but also is difficult for the operator to use. Another approach is the design of a follower that seals in two different diameter bores by flipping or reversing an outer lip on the follower. While this has been somewhat satisfactory, it is also difficult for the operator to use since the operator must remove the follower to go through this reversing process.

A still further approach has been to provide a long axially extending outer wall that is very thin so that it can flex outwardly in different diameter bores. Such a construction is shown in the Chester Dorn pat. No. 3,655,101. The problem in this thin outer walled follower is that the wall must be supported at both ends to achieve the desired flexing action. To achieve this, Dorn provides a plurality of plates or washers at the forward end of the follower to keep the outer wall concentric with the axis of the follower rod and also to pull the outer wall forwardly. While this construction has been found satisfactory for cartridge and bulk loading use, it is difficult to manufacture and costly because of the many parts and washers required to support the thin outer wall.

It is a primary object of the present inventon to ameliorate the problems noted above in the prior art of follower assemblies for multiple loaded lubrication guns.

SUMMARY OF THE PRESENT INVENTION

In accordance with the present invention, a follower assembly is provided in which the follower head or body is a simple one-piece elastomeric rubber molding that does not require any washers for supporting the sealing walls. This one-piece follower body includes a heavy central annular portion slidable on the follower rod with an integral radially outwardly and rearwardly extending heavy section. This heavy section supports the rear end of a forwardly extending thin sealing outer wall that flexes to seal the follower in either the gun cylinder or the cartridge sleeve. The forward end of this thin outer wall has a heavy inwardly directed flange that assists in supporting the forward end of the wall.

An annular array of integral posts on the heavy rearwardly extending section engage this heavy flange as the follower is pushed forwardly to effectively pull the thin outer wall. These posts, or at least the radial outermost portions of these posts, maintain concentricity of the thin outer wall with respect to the axis of the follower rod.

The follower rod has a first swaged wing or projection that selectively engages a back-up plate for the follower so that the follower body may be pushed forwardly manually with the follower rod during loading or manual priming. The back-up plate also serves as a spring seat for a coil compression spring that continuously urges the follower body in a forward direction. To pull the follower rearwardly during suction loading or removal, a second swaged wing projection is formed on the follower rod that engages a loose washer with the forward end of the follower body.

In this manner the present follower assembly is essentially a one-piece elastomeric body that does not require any of the supporting washers of prior art constructions, does not require the reversal of any lips or walls to achieve cartridge as well as bulk loading, and does not require any supplemental guide to shift the follower body from the cylinder wall diameter to the cartridge sleeve diameter.

DETAILED DESCRIPTION OF THE PREFERRED EMBODIMENT

Figure 1:
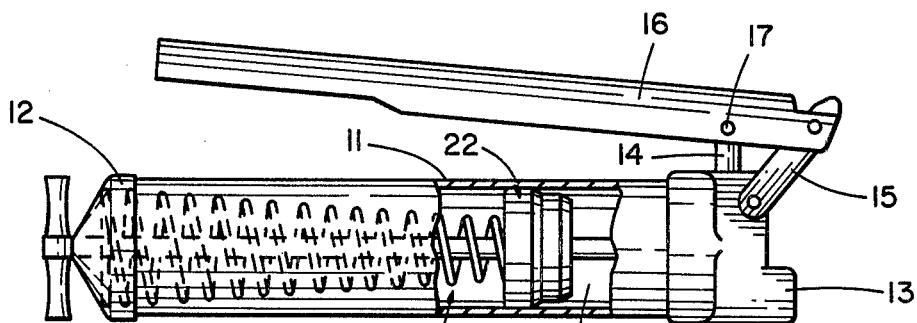
FIG. 1 is a plan view, partly broken away, of a typical lubrication gun with the present follower assembly illustrated therein.

Referring to the drawings, and particularly FIG. 1, a grease gun 10 is illustrated having a cylindrical body or grease barrel 11 for receiving lubricant, closed at the rear end by an end cap 12 and carrying at its forward end a dispensing head 13. The heavy lubricant in the grease barrel 11 is drawn into the dispensing head and expelled under pressure by a reciprocal plunger 14 which is manually operated by a two-bar linkage including a first link 15 pivotally connected at one end to the head 13 and at the other end to an operating lever 16 that is pivotally connected at 17 to piston 14 to provide the necessary mechanical advantage for driving the piston 14 downwardly to expel lubricant from the lubrication gun through the dispensing head 13. These portions of the lubrication gun are conventional and form no part of the present invention.

A follower assembly 18 is provided for continuously urging lubricant in chamber 19 toward the dispensing head 13. In addition to continuously urging lubricant in chamber 19 toward the dispensing head 13, the follower assembly may be manually pushed forwardly, such as in manual priming, and positively withdrawn during loading.

Figure 2:
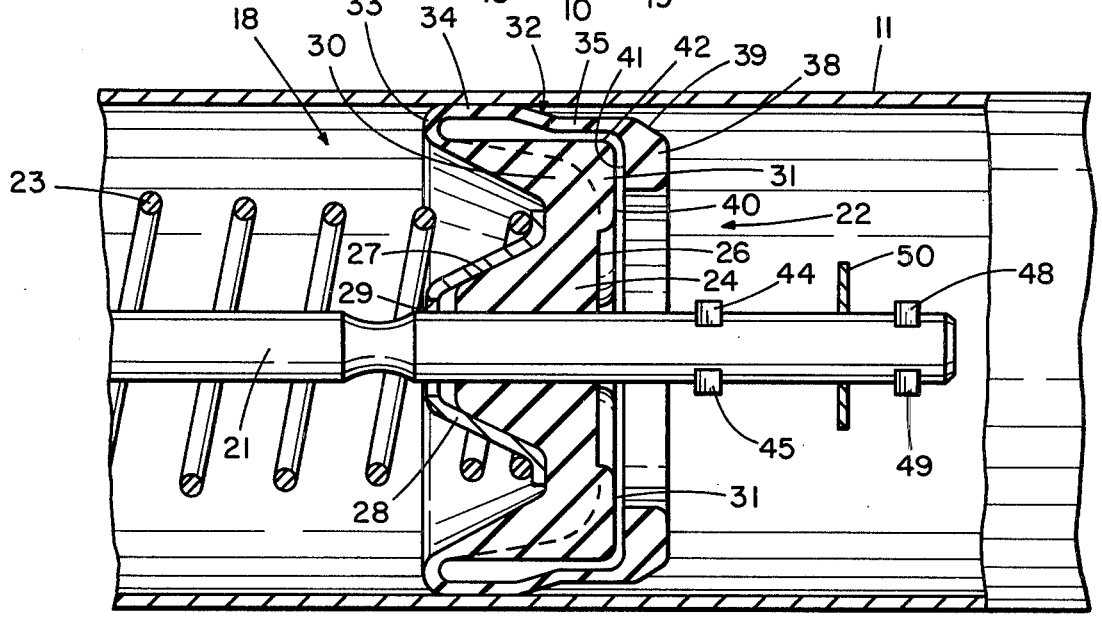
FIG. 2 is an enlarged fragmentary view of the present follower assembly in a lubrication gun cylinder with the follower rod disengaged.
Figure 3:
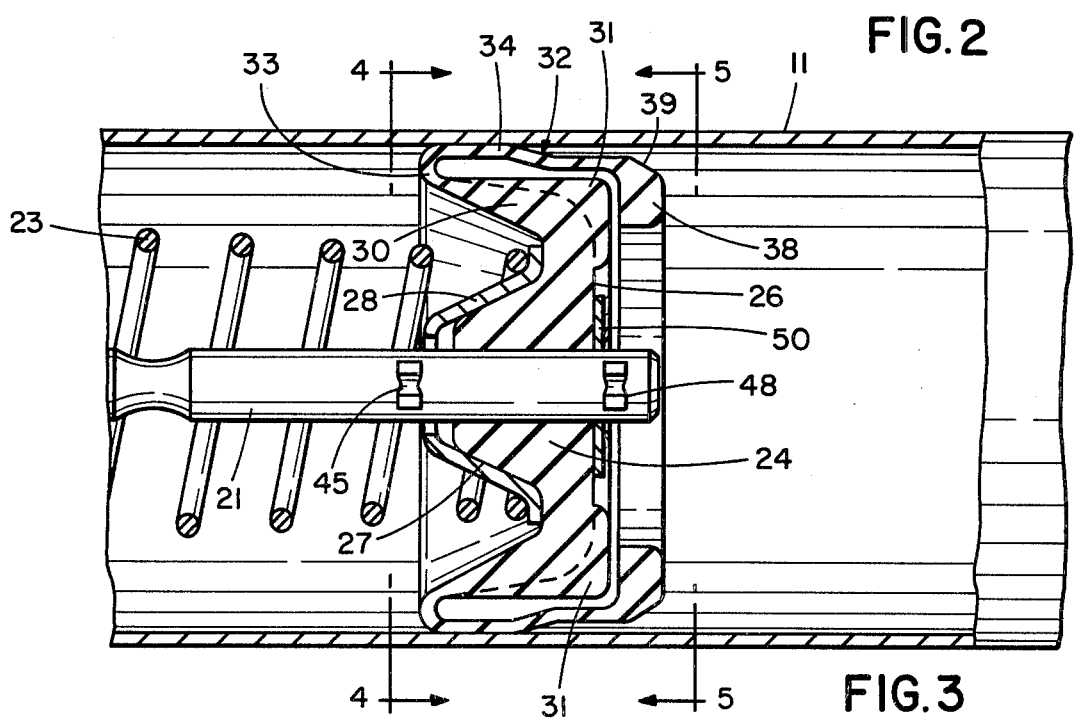
FIG. 3 is a fragmentary-section of the present follower assembly in a lubrication gun cylinder with the follower engaged.

Referring to FIGS. 2 and 3, the follower assembly 18 is seen to generally include a follower rod 21 with a one-piece elastomeric follower body 22 slidable thereon, and a coiled compression spring 23 for continuously urging the follower body 22 in a forward direction. The follower body is a one-piece molding of oil resistant rubber, such as nitrile rubber.

the follower body 22 has a heavy annular boss portion 24 having a central bore 25 slidably receiving follower rod 21. The central portion 24 has a flat radially extending forward face 26 and a frusto-conical rear wall 27. The frusto-conical rear wall 27 receives a cup-shaped back-up plate 28 having a central opening 29 for freely receiving the follower rod 21. The cup-shaped back-up plate acts as a spring seat for the coil compression spring 23. The follower body 22 has a rearwardly and radially outwardly extending tapered portion 30 that serves essentially a support function. The support section 30 has six equally spaced axially extending, annularly arrayed integral posts 31 extending forwardly therefrom that assist in driving the follower body 22 forwardly and also maintain the concentricity of the follower body 22 with respect to the axis of follower rod 21.

Figure 6:
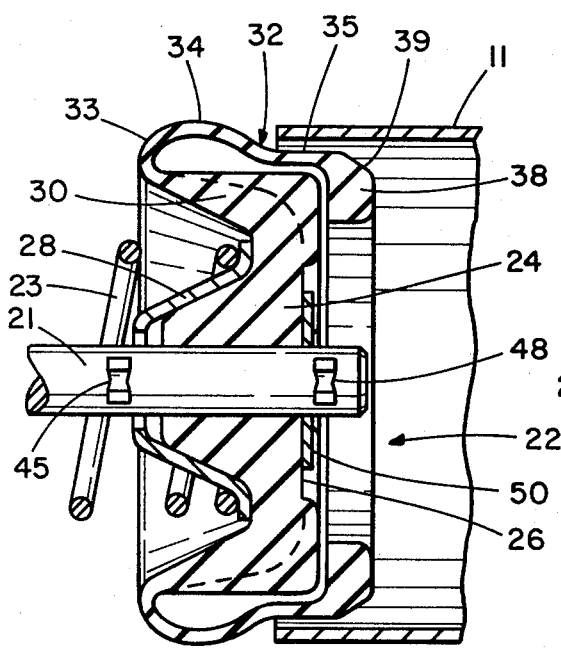
FIG. 6 is a fragmentary-section showing the follower assembly just prior to insertion into a lubrication gun cylinder.
Figure 7:
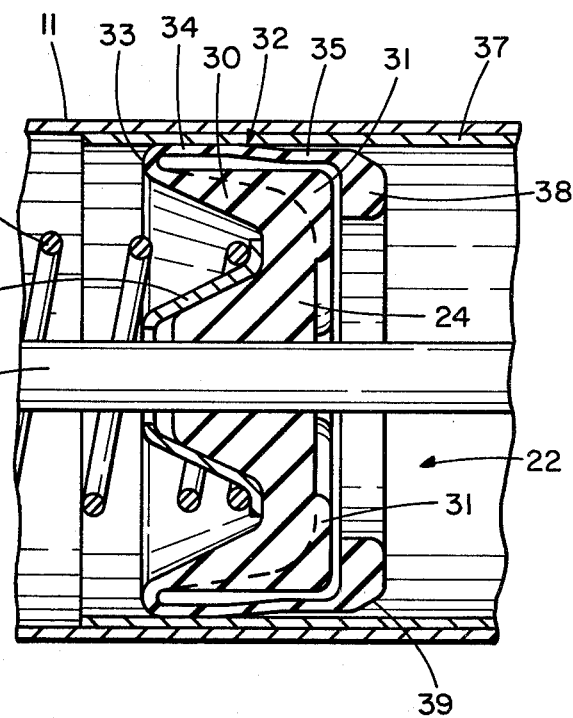
FIG. 7 is a fragmentary-section showing the follower assembly in a lubrication cartridge.

A forwardly directed thin sealing outerwall 32 extends from the rear end of the support section 30 forwardly. This outer wall includes a U-shaped section 33 continuing into a gently curved sealing section 34. As seen in FIG. 6, the outer diameter of the curved sealing section 34 is greater than the outer diameter of the lubrication gun cylinder 11 so that it deforms inwardly upon entry into the cylinder. The sealing portion 34 continues to a reduced substantially straight annular portion 35 that has an outer diameter slightly less than the inner diameter of a conventional lubrication cartridge 37, as seen best in FIG. 7. The inner diameter of annular portion 35 is slightly greater than the diameter of a circle struck by the radially outermost portions of the posts 31. The forward end of the straight cylindrical section 35 has a radially inwardly directed heavy flange 38 that provides support for the forward end of the thin wall 32. The flange 38 has a frustro-conical leading edge surface 39 that assists in guiding the follower body 22 into both the cylinder 11 and the cartridge sleeve 37.

The outer wall 32 is sufficiently thin so that as the follower 22 is driven forwardly either by follower rod 21 or by spring 23, forward surfaces 40 on the cylindrical posts 31 engage rear wall 41 of the heavy annular flange 38. In this manner, the posts 31 serve to pull the outer wall 32 forwardly. The radially outermost portions 42 of posts 31, i.e., radially outermost with respect to the axis of follower rod 21, frequently engage the outer wall portion 35 to maintain the concentricity of the outer wall 32 with respect to the axis of follower rod 21. Upon withdrawal of the follower body 22 by follower rod 21, the heavy section 30 of the follower body 22 pulls the fragile outer wall 32 rearwardly. In this manner support is provided for the outer wall at both ends and the integrity of the wall is maintained in either direction or movement of the follower body 22.

Figure 4:
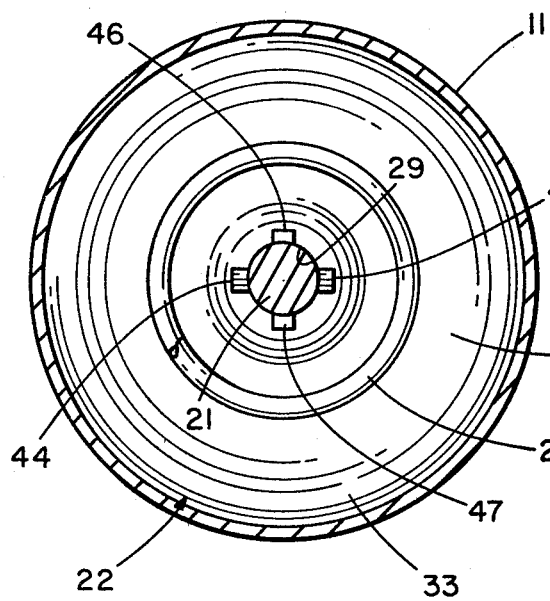
FIG. 4 is a cross-section taken generally along line 4—4 of FIG. 3.
Figure 5:
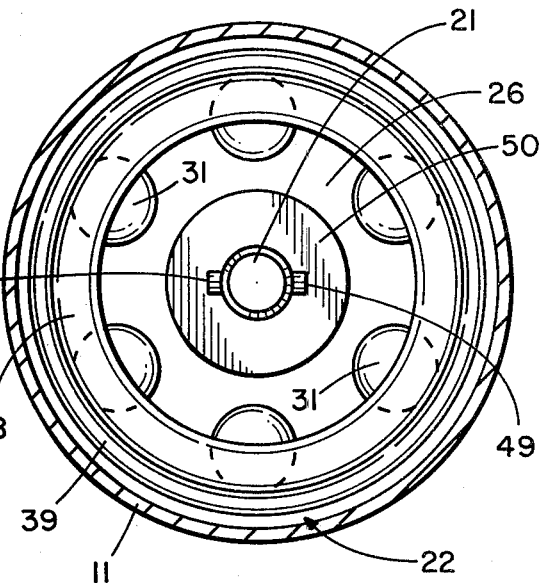
FIG. 5 is a cross-section taken generally along line 5—5 of FIG. 3.

For the purpose of selectively moving the follower body 22 with the follower rod 21, such as for manual priming in the forward direction, a first pair of swaged wings 44 and 45 are provided on the follower rod 21. These wings may pass freely through the follower 22 from the position shown in FIG. 2 to the position shown in FIG. 3. The central opening 29 in back-up plate 28 has diametrical recesses 46 and 47 that permit the swaged wings 44 and 45 to pass therethrough. After passing through the recesses 46 and 47, the rod 21 may be rotated 90 degrees to the position shown in FIG. 4 where the projections 44 and 45 engage the back-up plate 28 so that in this postition when the follower rod 21 is pushed forwardly, the follower body 22 will move therewith.

For the purpose of withdrawing the follower body 22 in the cylinder 11, a second pair of swaged wings 48 and 49 are provided spaced forwardly from the projections 44 and 45. These projections are spaced from the projections 44 and 45 so that as projections 44 and 45 engage back-up plate 28, the projections 48 and 49 will position the washer 50 almost into engagement with the follower front wall 26. As follower rod 21 is pulled rearwardly, projections 48 and 49 bring washer 50 into tight engagement with the front wall 26 moving the follower 22 rearwardly.

What is claimed is:

1. A follower assembly for a lubrication gun adapted to hold either lubricant in bulk form or a cartridge of lubricant a cylindrical body member, comprising: a follower rod reciprocable in the cylindrical body member of the lubrication gun; a follower body constructed of resilient material surroundng the follower rod; said follower body having a first annular portion with a bore therethrough to slidably receive the follower rod, a second generally radially extending portion connected to the first portion, a third generally rearwardly extending portion connected to the second portion, and a fourth generally forwardly extending portion connected to the third portion; and means carried by one of the first, second and third portions and spaced from the fourth portion for supporting the fourth portion by intermittent engagement.

2. A follower assembly for a lubrication gun adapted to hold either lubricant in bulk form or a cartridge of lubricant in a cylindrical body member as defined in claim 1, wherein the means for supporting the fourth portion includes a plurality of projections on said third portion engageable with said fourth portion as the follower body flexes.

3. A follower assembly for a lubrication gun adapted to hold either lubricant in bulk form or a cartridge of lubricant in a cylindrical body member as defined in claim 1, wherein said means for supporting the fourth portion includes a plurality of forwardly extending projections integral with said second portion of the follower body.

4. A follower assembly for a lubrication gun adapted to hold either lubricant in bulk form or a cartridge of lubricant in a cylindrical body member as defined in claim 1, wherein said follower body has a fifth portion connected to the fourth portion and extending generally radially inwardly and positioned to be selectively engaged and pushed by the means to support the fourth portion of the follower body so that the follower body may be driven forwardly.

5. A follower assembly for a lubrication gun adapted to hold either lubricant in bulk form or a cartridge of lubricant in a cylindrical body member as defined in claim 1, including a back-up plate behind the first portion of the follower body, and spring means engaging and biasing the back-up plate, said follower rod having means engageable with said back-up plate to drive the follower body forwardly.

6. A follower body assembly for a lubrication gun of the type having a cylindrical body adapted to receive either bulk lubricant or a lubrication cartridge, comprising: a follower rod adapted to be reciprocally mounted in the cylindrical body of the lubrication gun; a follower body constructed of resilient material slidably received on said follower rod; said follower body having a first generally radially extending portion, a second generally rearwardly extending portion connected to the first portion, a third generally forwardly extending portion connected to the second portion and adapted to sealingly engage the follower body in either the cylindrical body or inside a lubrication cartridge in the cylindrical body, and a fourth generally radially inwardly extending portion connected to the third portion, said fourth portion having a thickness substantially greater than the thickness of the third portion; and a projection relatively movable with respect to the fourth portion carried by the first portion for selectively engaging the fourth portion as the first portion moves forwardly to pull the third portion in a forward direction.

7. A follower assembly for a lubrication gun of the type having a cylindrical body adapted to receive either bulk lubricant or a lubrication cartridge as defined in claim 6, wherein said projection includes a plurality of integral projections extending forwardly from said first portion.

8. A follower assembly for a lubrication gun of the type having a cylindrical body adapted to receive either bulk lubricant or a lubrication cartridge as defined in claim 6, including a back-up plate engaging the rear side of said first portion, a spring engaging said back-up plate, said follower rod having a first projection engageable with said back-up plate for moving the follower body forwardly, and said follower rod having a second projection engageable with the front of the first portion for moving the follower body rearwardly.

9. A follower assembly for a lubrication gun of the type having a cylindrical body that holds lubricant, comprising: a follower rod slidable in the cylindrical body of the lubrication gun, a follower body constructed of resilient material slidable on the follower rod, a back-up plate engaging the rear of the follower body, and a spring engaging the back-up plate, said follower rod having a projection near the forward end thereof for selectively engaging the back-up plate for moving the follower body forwardly, said back-up plate being constructed to permit said projection to selectively pass therethrough.

10. A follower assembly for a lubrication gun having a cylindrical body that holds bulk lubricant as defined in claim 9, including a second projection on said follower rod spaced forwardly from said first projection engageable selectively with the front end of the follower body to move the follower body rearwardly.

11. A follower assembly for a lubrication gun having a cylindrical body that holds bulk lubricant or a lubrication cartridge, comprising: a follower rod slidable in the cylindrical body of the lubrication gun; an integral one-piece resilient follower body slidable on the follower rod; said follower body including a first annular boss portion slidable on the follower rod, a second radially extending portion connected to said first portion having a plurality of relatively heavy posts projecting forwardly therefrom, a third relatively heavy portion connected to said second portion and extending rearwardly therefrom, a fourth portion connected to said third portion and extending outwardly beyond the inner diameter of the cylindrical body of the lubrication gun and forwardly beyond said posts on the second portion, and a fifth portion connected to said fourth portion and extending radially inwardly inside the outer diameter of the posts, said fifth portion being normally axially spaced from the posts, said fourth portion being sufficiently flexible so that the posts will engage and drive the fifth portion forwardly as the follower body moves forwardly.

12. A follower assembly for a lubrication gun having a cylindrical body that holds bulk lubricant or a lubricant cartridge, comprising; a follower rod slidable in a cylindrical body of the lubrication gun; an integral one-piece resilient body slidable on the follower rod; said follower body including a first annular boss portion slidable on the follower rod, a second radially extending portion connected to said portion and having a plurality of relatively heavy posts projecting forwardly therefrom, a third relatively heavy portion connected to said second portion and extending rearwardly therefrom, a fourth portion connected to said third portion and extending outwardly beyond the inner diameter of the cylindrical body of the lubrication gun and forwardly beyond the posts on the second portion, a fifth portion connected to said fourth portion and extending radially inwardly inside the outer diameter of the posts, said fifth portion being normally axially spaced from said posts, said fourth portion being sufficiently flexible so that the posts will engage and drive the fifth portion forwardly as the follower body moves forwardly, a back-up plate engaging the rear of the first annular boss portion, and a spring engaging the back-up plate, said follower rod having a projection thereon engageable with the back-up plate for driving the follower body forwardly,, said back-up plate having a recess to permit the projection to pass therethrough so that the follower rod can selectively move forwardly without the follower body.

13. A follower assembly for a lubrication gun having a cylindrical body that holds bulk lubricant or a lubricant cartridge, comprising: a follower rod slidable in a cylindrical body of the lubrication gun; an integral one-piece resilient body slidable on the follower rod; said follower body including a first annular boss portion slidable on the follower rod, a second radially extending portion connected to said first portion and having a plurality of relatively heavy posts projecting forwardly therefrom, a third relatively heavy portion connected to said second portion and extending rearwardly therefrom, a fourth portion connected to a third portion and extending outwardly beyond the inner diameter of the cylindrical body of the lubrication gun and forwardly beyond the posts on the second portion, and a fifth portion connected to said fourth portion and extending radially inwardly inside the outer diameter of the posts, said fifth portion being normally axially spaced from said posts, said fourth portion being sufficiently flexible so that the posts will engage and drive the fifth portion forwardly as the follower body moves forwardly; a back-up plate engaging the rear of the first annular boss portion, a spring engaging the back-up plate, said follower rod having a projection thereon engageable with the back-up plate for driving the follower body forwardly, said back-up plate having a recess to permit the projection to pass therethrough so that the follower rod can selectively move forwardly without the follower body, a washer around said follower rod forwardly of said first annular boss portion, and a second projection on said follower rod spaced forwardly of said washer and engageable therewith so that as the follower rod is moved rearwardly the second projection will move the washer into engagement with the first portion of the follower body to move the follower body rearwardly.

14. A follower assembly for a lubrication gun adapted to hold either lubrication in bulk form or a cartridge of lubricant in a cylindrical body member, comprising; a follower rod reciprocable in the cylindrical body member of the lubrication gun, a follower surrounding the follower rod, said follower having a first annular portion with a bore therethrough to slidably receive the follower rod, said follower having a second generally radially and rearwardly extending portion connected to the first portion, a third generally forwardly extending portion connected to the second portion and having a resilient section engageable with the interior of the cartridge or the cylindrical body member, and means carried by one of said first and second portions for supporting the third portion by intermittent engagement therewith.

15. A follower assembly for a lubrication gun adapted to hold either lubricant in bulk form or a cartridge of lubricant in a cylincrical body member, comprising; a follower rod reciprocable in the cylindrical body member of the lubrication gun, a follower surrounding the follower rod, said follower having a first annular portion with a bore therethrough to slidably receive the follower rod, said follower having a second generally radially and rearwardly extending portion connected to the first portion, a third generally forwardly extending portion connected to the second portion and having a resilient section engageable with the interior of the cartridge or the cylindrical body member, and means carried by one of said first and second portions, for selectively engaging the third portion as the first and second portions move forwardly to move the third portion therewith in a forward direction.

* * * * *